April 23, 1974   A. N. DEY ET AL   3,806,369

LIGHT METAL-SULFUR ORGANIC ELECTROLYTE CELL

Original Filed Nov. 13, 1968

INVENTORS
PER BRO
ARABINDA NARAYAN DEY
BY
ATTORNEY

United States Patent Office 3,806,369
Patented Apr. 23, 1974

3,806,369
LIGHT METAL-SULFUR ORGANIC ELECTROLYTE CELL
Arabinda N. Dey, Needham, and Per Bro, Andover, Mass., assignors to P. R. Mallory & Co., Inc., Indianapolis, Ind.
Continuation of abandoned application Ser. No. 775,444, Nov. 13, 1968. This application Feb. 28, 1972, Ser. No. 230,523
Int. Cl. H01m 35/00
U.S. Cl. 136—6 LN    10 Claims

ABSTRACT OF THE DISCLOSURE

A light metal anode-sulfur cathode cell employing an organic electrolyte is provided with improved cell separator means. Ion exchange membranes exhibiting compatibility with organic solvents, and having high exchange capacity and high electrical conductivity have been determined to be suitable for use as cell separators and to have such physical and electrostatic characteristics as to provide improved cell utilization efficiency and extended shelf life.

BACKGROUND OF THE INVENTION

Field of the invention

This invention pertains to high energy density cells employing light metal anodes and sulfur cathode members in organic electrolytes, and more particularly to cells of this type incorporating ion selective membranes as cell separators.

Description of the prior art

This application is a continuation of S.N. 775,444, filed Nov. 13, 1968, which is now abandoned.

In S.N. 536,814 now matured into U.S. Pat. No. 3,413,-154, assigned to common assignee, there is disclosed a high energy density cell comprised of a light metal anode, a sulfur cathode, an organic electrolyte and a thin barrier of microporous inert material The organic electrolyte of the cell is composed of an organic solvent in which there is dissolved a light metal or ammonium salt containing a tetrafluoroborate, tetrachloroaluminate, perchlorate or chloride anion.

While the sulfur cathode of such cells is not itself soluble in the organic electrolyte, certain discharge products of the cathode are soluble. Thus, it has been observed that during shelf life and operation of this type of cell there are formed, for example, soluble polysulfides, $S_x^2$, $x=2-9$.

Diffusion of these polysulfides in the cell electrolyte is not particularly detrimental to cell shelf life or utilization, if migration thereof from cathode to anode is prevented.

Thus, if soluble discharge products are confined and remain in proximity to the cathode, the collective mass comprised of the cathode and its soluble discharge products will permit cell utilization of a high order.

In the light metal sulfur-organic electrolyte cells of the above-mentioned application, it has been observed that some migration of the soluble polysulfides away from the cathode occurs. The barrier of the cells is comprised of a microporous member adapted only to reduce free electrolyte flow to a negligible rate. While effective to provide a substantial physical impediment to migration of all ionic species in the cell and a resultant confinement of polysulfides, the barrier is not selectively effective to retard deleterious migration such that maximum cell utilization may be attained.

SUMMARY OF THE INVENTION

The present invention provides improved shelf life and utilization efficiency in cells comprising a light metal anode, a cathode, the active material of which is sulfur, and an electrolyte consisting of an organic solvent containing a salt by introducing therein a cell barrier member or separator capable of selectively impeding the migration of certain ionic species in the cell. In particular, barrier means providing both physical and selective electrostatic retardation of migration is incorporated in the cell in the form of an ion exchange membrane separator.

In the present invention it has been discovered that certain membranes, designed for commercial use in aqueous mediums for such purposes as water demineralization, dealkalization and softening, and comprised of synthetic organic resins comprising cross-linked polyelectrolytes having large numbers of ion active groups attached thereto, are effective to provide the requisite physical impediment to migration and further are operative to substantially reduce if not totally inhibit the migration of soluble cathodic discharge products in light metal-sulfur organic electrolyte cells.

In the present invention there has been determined further the feasibility of the use of membranes of cationic nature to retard the migration of soluble polysulfide discharge products.

It is a primary object of the present invention to provide a light metal-sulfur organic electrolyte cell having improved shelf life and utilization efficiency.

It is a further object of this invention to provide a light metal-sulfur organic electrolyte cell incorporating means for physically and electrostatically rearding the migration of soluble ionic active material.

It is an additional object of this invention to provide a high energy density cell comprising a light metal anode, a cathode the active material of which is sulfur, an organic electrolyte and an ion exchange membrane cell separator.

The foregoing and other objects and features of the invention will be evident from the following detailed description of the invention and the accompanying drawings.

DESCRIPTION OF A PREFERRED EMBODIMENT

Figure 1:
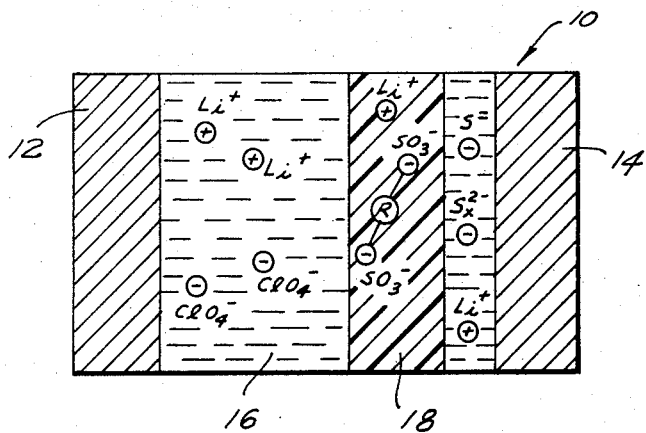
FIG. 1 is a schematic drawing of a cell arranged in accordance with the invention illustrating the cell barrier structure and ionic species present in the cell.

In the schematic drawing of FIG. 1, there is set forth a cell 10 comprised of a lithium anode 12 and a sulfur cathode 14 immersed in an organic electrolyte 16. Also disposed in contact with the electrolyte is a barrier element 18 so arranged in the cell as to separate the anode and cathode members. In this construction of a practical cell, barrier 18 is placed upon cathode 14 and there is interposed between anode 12 and barrier 18 an absorbent element which is saturated with the electrolyte. The absorbent is placed in direct contact with its interfaced cell components such that the electrolyte is in electrical contact with the anode and the barrier. Electrolyte contact with the cathode is restricted by the microporosity of the barrier to an extent that free flow of electrolyte therethrough is reduced to a negligible rate. In operation of the practical cell, however, both electrodes of the cell are effectively immersed in the electrolyte in the manner generally indicated in FIG. 1.

Electrolyte 16 of the cell of FIG. 1 is comprised of an organic solvent containing salts of light metal or ammonium cations and tetrafluoroborate, tetrachloroaluminate, perchlorate or chloride anions. Suitable organic solvents for use in the cell comprise propylene carbonate, gamma-butyrolactone, tetrahydrofuran, dimethyl formamide and dimethyl sulfoxide. These solvents may be used individually or in admixture with each other, or with other solvents, such as ethylene carbonate, acetonitrile and methyl or butyl formate.

In addition to lithium, light metal anode may be formed of sodium, magnesium, calcium, beryllium, aluminum, and the like.

For purposes of explanation of the characteristics and function of barrier 18, the cell of FIG. 1 will be discussed as having an electrolyte comprised of lithium perchlorate ($LiClO_4$) in tetrahydrofuran (THF). The ionic constituency of this electrolyte is the lithium cation $Li^+$ and the perchlorate anion $ClO_4^-$. Also present in the electrolyte are polysulfide anions $S_x^{2-}$, $x=2-9$, this being a soluble cathodic discharge product, and sulfur anions $S^=$.

In operation of the cell, it is of course essential that ionic conductivity be maintained in the electrolyte by the migration of cations to cathode 14 from anode 12. It is further essential that free electrolyte flow be reduced to a negligible rate. These considerations demand that barrier 18 have at least the characteristic of microporosity, i.e. that the barrier provide a common physical impediment to ion transport.

Barriers having only this characteristic, such as are disclosed in the referenced U.S. 3,413,154, do not particularly discriminate against migration of any ionic species in the electrolyte. Thus, the cathodic mass comprised of the sulfur electrode 14, and the dissolved polysulfide undergoes some measure of self-discharge with the polysulfide anions becoming distributed throughout the electrolyte rather than being confined to the cathode side of the barrier. Attending such migration of the polysulfide anions is a further cell reaction in which the lithium anode becomes passivated over an extended period of time.

In contrast to barriers providing only a characteristic microporosity, barrier 18 of the cell of FIG. 1 includes the further property of permselectivity, i.e. the barrier permits passage of some ionic species and not others.

It has been found that a barrier having suitable microporosity and permselectivity for use in a light metal-sulfur organic electrolyte cell may consist of commercially available ion exchange membranes heretofore in widespread use for demineralization, dealkalization and softening of water and like purposes in connection with aqueous mediums. Such membranes are synthetic organic resins comprising cross-linked polyelectrolytes having a large number of ion active groups attached thereto. In general these membranes comprise a cross-linked polystyrene polymer which is sulfonated or carboxylated to develop the cationic exchange membrane or which is aminated to develop the anionic exchange membrane. Barrier 18 of FIG. 1 is illustrated as a cationic membrane comprised of rigid molecules R of the insoluble polymer each having a functional sulfonated group $SO_3^-$ attached thereto, the membrane incorporating further a required lithium counter cation $Li^+$. The lithium counter cation in contrast to the rigid molecule and attached functional group, is bound loosely in the membrane and is capable of ready movement from the membrane into an associated solution. One characteristic for membrane selection is that the concentration of counter cations in the membrane be considerably greater than the concentration of cations in the cell electrolyte. Thus, in the cell of FIG. 1, barrier 18 preferably has a concentration of lithium ions of approximately ten times the concentration of lithium ions in the lithium perchlorate tetrahydrofuran electrolyte.

As a result of these relative concentrations and the loose containment of the counter cations in the membrane, upon assembly of the cell, the lithium counter cations contained in barrier 18 tend to egress from the membrane into the electrolyte. As a result, the membrane acquires a net negative charge and there is established the Donnan potential difference between the membrane and the electrolyte, a primary prerequisite for permselectivity. The membrane is thereby rendered effective to electrostatically repel migrating polysulfides which also bear a negative charge.

Barrier 18 is a cation permeable electronegative membrane and has no electrostatic effect on the lithium ions in the electrolyte or other cations in the cell. Thus, cell cations encounter no other difficulty in migration to cathode 14 other than that posed by the microporous character of barrier 18. In this connection, it has been clearly established by migration testing and utilization testing that the cationic membrane is effective to reduce if not totally inhibit migration of the polysulfide anions from cathode to anode and that the membrane is not effective in inhibiting migration of cell cations to the extent that cell performance is degraded during its extended operating life when compared with the performance of the filter paper equipped cells during their shorter operating life.

Migration testing

In order to evaluate the effect of the ion exchange membrane cell barrier on polysulfide migration an H-cell was constructed. One half of the cell was filled with a colorless 0.1 molar solution of lithium perchlorate in tetrahydrofuran. The other cell half was filled with a deep brown polysulfide solution constituted of excess lithium sulfide and sulfur in tetrahydrofuran. A cation exchange membrane available commercially as RAI P300 40/20, a product of RAI Research Corporation, was placed between the cell halves along with an O-ring providing a seal to prevent leakage. The two cell halves were then clamped together. The distinct coloration of the constituents of each of the two cell halves permitted a ready observation of polysulfide diffusion. During an observation period of six weeks, no color change of cell halves was noted, supporting a conclusion that there was no diffusion of the polysulfide anions through the cation exchange membrane.

Utilization testing

In a second experimental series, the effect of an ion exchange membrane barrier on the utilization of a sulfur cathode was studied. The extensive improvement in utilization is evident in the graphic showing of results in FIG. 2. In this series of tests, three cells were constructed, each including a silver reference electrode, a lithium anode and a cathode prepared by filling a stainless steel screen (500 mesh) bag with a 1:1 mixture of sulfur and graphite pressed at 2000 pounds per square centimeter. The silver reference electrode was included solely for voltage measurement purposes and is of course not employed in practical cells. In each cell the electrolyte consisted of a one molar solution of lithium perchlorate in tetrahydrofuran. In one cell (A) the barrier was a filter paper separator. Current density was one ma./cm.² It will be seen in FIG. 2 that the cell provided an open circuit voltage of about 3.0 volts and an initial operating voltage of 2.4 volts under load. Cell utilization efficiency of 20% may be seen in FIG. 2.

Figure 2:
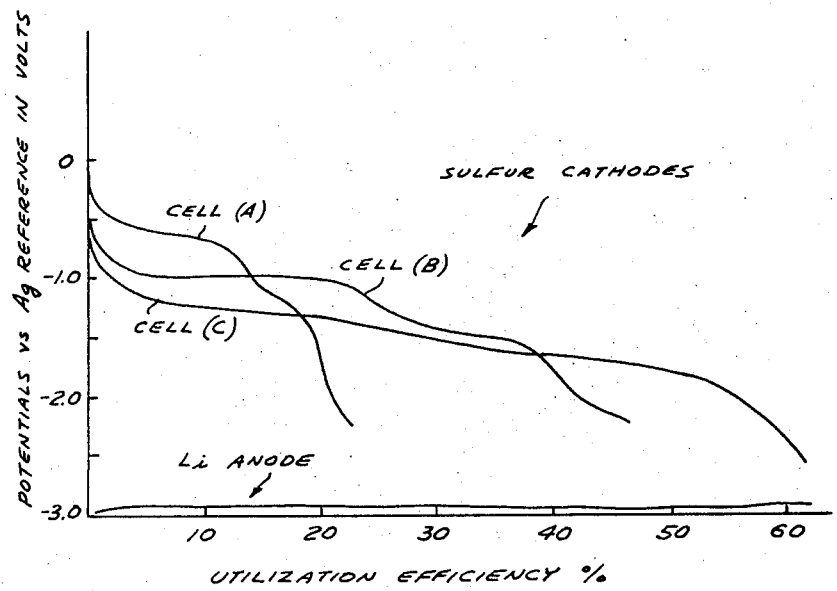
FIG. 2 is a graphic display of the operating characteristics of cells constructed in accordance with the invention in comparison with those of a like cell employing a glass filter paper separator as the cell barrier member.

In a second cell (B) the barrier was constituted of one layer of the RAI P300 40/20 ion exchange membrane. Cell current density was one ma./cm.² As indicated in FIG. 2, the cell provided an open circuit voltage of about 3.0 volts and an initial operating voltage of 2.1 volts under load. As shown in FIG. 2, cell utilization efficiency was 40%.

In a third cell (C) the barrier member was constituted of two layers of the RAI P300 40/20 ion exchange membrane. Current density was 0.5 ma./cm.². The cell again provided an open circuit voltage of about 3.0 volts and an. initial operating voltage of 1.7 volts under load. Cell utilization efficiency of almost 60% may be seen in FIG. 2.

The results of this testing of cells (B) and (C) indicate that improvements in utilization of twofold and threefold may be achieved by the use of cationic exchange membranes in lithium-sulfur organic electrolyte cells. It appears that the only cell characteristic which is degraded in this improvement is cell output voltage under load which decreases by reason of increased internal cell resistance. In cell (B) this decrease in cell output voltage amounts to approximately 10%. This utilization testing establishes further, particularly when taken in conjunction with the migraiton testing above, that the presence of the ion exchange membrane in the cell, while effective to inhibit migration of the polysulfide anions, does not inhibit migration of the lithium cation necessary for cell operation.

It will be evident that the nature of the ion exchange membrane, i.e. cationic or anionic, employed in the lithium-sulfur cell is dependent upon the nature of the ionic species whose migration is desired to be inhibited. While the discussion has centered upon the soluble polysulfides and their retention in the vicinity of the cell cathode, it is within the contemplation of the inventon to employ an anionic exchnage membrane as a cell separator where the constituency of the cell gives rise to the presence in the cell of a cation whose migration is detrimental to cell shelf life and utilization. Similarly, it is within the contemplation of the invention to employ as the barrier member of the lithium-sulfur organic electrolyte cell a bipolar or amphoteric ion exchange membrane, i.e. a membrane having anionic and cationic components.

The above-discussed requisite that the ion exchange membrane contain a relatively high concentration of counter anions compared to the concentration of anions in the electrolyte, is generally indicated by the exchange capacity of the membrane which is defined as the number of equivalents of fixed ionic groups in the resin per unit weight (dry) of the resin. For commercially available ion exchange membranes, the exchange capacity is normally determined in aqueous medium for which application of the membrane is designed. Thus, in the present use of such membranes, in a non-aqueous medium, it should be noted that membrane exchange capacity is generally reduced from that specified by the manufacturer. Reduction of exchange capacity in the order of 40% may be expected in the organic electrolytes.

A further consideration in the selection of a barrier member for a lithium-sulfur organic electrolyte from the commercially available ion exchange membranes is the compatibility of the membrane with the electrolyte solvent. In this regard membrane suitability may be determined by placing the selected membrane in the organic solvent and observing the effect of the solvent thereon. Solubility of the membrane resin or its backing member in the solvent renders the membrane unsuitable for use.

One further characteristic of importance to the selection of membranes for use in the present invention is membrane conductivity. In this connection, it should be noted that the low conductivity (high resistivity) membranes produce undesirably high cell IR drops. Thus, higher conductivity membranes are preferably employed. It should be noted also that membrane conductivity may be improved by increasing its exchange capacity. Thus, increasing the lithium ion concentration in a membrane will render useful an otherwise unsuitable membrane.

While this invention has been described in connection with the above particular cell structure, this is intended in a descriptive and not a limiting sense. Such changes and modifications as will be evident to those having ordinary skill in the art to which the invention applies are within the contemplation of the invention.

What is claimed is:

1. A high energy density electric cell comprising a light metal anode, a cathode the active material of which is sulfur, an organic electrolyte comprising an organic solvent containing an inorganic salt dissolved therein and microporous permselective barrier means separating said cathode and said electrolyte, said barrier means comprising an ion exchange membrane comprising a cross-linked polystyrene polymer.

2. The electric cell claimed in claim 1 wherein said ion exchange membrane is cationic.

3. The electric cell claimed in claim 1 wherein said cathode includes a particulate material of higher electrical conductivity than sulfur.

4. The cell claimed in claim 1 wherein said electrolyte comprises an organic solvent selected from the group consisting of propylene carbonate, gamma-butyrolactone, tetrahydrofuran, dimethyl formamide and dimethyl sulfoxide, said solvent containing a salt.

5. The cell claimed in claim 4 wherein said salt includes a cation selected from the group including ammonium and light metals.

6. The cell claimed in claim 5 wherein said salt includes an anion selected from the group consisting of tetrafluoroborate, tetrachloroaluminate, perchlorate and chloride.

7. The cell claimed in claim 1 wherein said anode is lithium.

8. The cell claimed in claim 7 wherein said electrolyte comprises tetrahydrofuran containing lithium perchlorate.

9. The cell claimed in claim 7 wherein said anode is magnesium.

10. The cell claimed in claim 7 wherein said anode is aluminum.

References Cited

UNITED STATES PATENTS

| | | | |
|---|---|---|---|
| 3,531,328 | 9/1970 | Bro et al. | 136—100 R |
| 3,532,543 | 10/1970 | Nole et al. | 136—6 LN |
| 3,639,174 | 2/1972 | Kegelman | 136—6 LN |
| 3,185,590 | 5/1965 | Mayer et al. | 136—6 LN |
| 2,861,116 | 11/1958 | Grubb, Jr. | 136—153 |
| 2,913,511 | 11/1959 | Grubb, Jr. | 136—120 FC |
| 3,393,092 | 7/1968 | Shaw et al. | 136—6 LN |
| 3,376,168 | 4/1968 | Horowitz | 136—146 |
| 3,393,093 | 7/1968 | Shaw et al. | 136—6 LN |
| 3,415,687 | 12/1968 | Methlie | 136—100 R |
| 3,413,154 | 11/1968 | Rao | 136—100 R |

ALLEN B. CURTIS, Primary Examiner

C. F. LE FEVOUR, Assistant Examiner

U.S. Cl. X.R.

136—100